(12) United States Patent
Anderson et al.

(10) Patent No.: US 7,493,518 B2
(45) Date of Patent: Feb. 17, 2009

(54) SYSTEM AND METHOD OF MANAGING EVENTS ON MULTIPLE PROBLEM TICKETING SYSTEM

(75) Inventors: Eric Anderson, Friendswood, TX (US); Kenneth M. Becker, Brandon, FL (US); Rhonda L. Childress, Austin, TX (US); James A. Riosa, Charlottesville, VA (US); Sandra J. Schlosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 11/274,841

(22) Filed: Nov. 15, 2005

(65) Prior Publication Data

US 2007/0112947 A1    May 17, 2007

(51) Int. Cl.
*G06F 11/00* (2006.01)
(52) U.S. Cl. .............................. 714/26; 714/45; 714/48; 714/25; 714/57
(58) Field of Classification Search .................... 714/25, 714/26, 48, 57
See application file for complete search history.

(56) References Cited

U.S. PATENT DOCUMENTS

| | | | |
|---|---|---|---|
| 6,006,016 A * | 12/1999 | Faigon et al. | 714/48 |
| 6,026,500 A | 2/2000 | Topff et al. | |
| 6,230,198 B1 | 5/2001 | Dawson et al. | |
| 6,742,141 B1 * | 5/2004 | Miller | 714/26 |
| 6,865,696 B2 | 3/2005 | Lopke | |
| 6,957,257 B1 * | 10/2005 | Buffalo et al. | 709/224 |
| 6,996,601 B1 * | 2/2006 | Smith | 709/203 |
| 7,266,734 B2 * | 9/2007 | Chavez et al. | 714/48 |
| 2002/0073355 A1 * | 6/2002 | Cerami et al. | 714/4 |
| 2002/0087680 A1 * | 7/2002 | Cerami et al. | 709/224 |
| 2002/0116484 A1 * | 8/2002 | Podracky | 709/223 |
| 2002/0169862 A1 * | 11/2002 | Bialk et al. | 709/223 |
| 2003/0056140 A1 * | 3/2003 | Taylor et al. | 714/4 |
| 2003/0110248 A1 * | 6/2003 | Ritche | 709/224 |
| 2003/0126001 A1 * | 7/2003 | Northcutt et al. | 705/8 |
| 2003/0140031 A1 | 7/2003 | Thomas et al. | |
| 2004/0042589 A1 * | 3/2004 | Grooms | 379/9.03 |
| 2004/0123189 A1 * | 6/2004 | Meurer | 714/48 |
| 2005/0131943 A1 * | 6/2005 | Lewis et al. | 707/104.1 |
| 2005/0160158 A1 * | 7/2005 | Firebaugh et al. | 709/223 |
| 2006/0041660 A1 * | 2/2006 | Bishop et al. | 709/224 |
| 2006/0242647 A1 * | 10/2006 | Kimbrel et al. | 718/104 |

* cited by examiner

*Primary Examiner*—Gabriel L. Chu
*Assistant Examiner*—Chae Ko
(74) *Attorney, Agent, or Firm*—Duke W. Yee; Libby Z. Handelsman; Rudolf O. Siegesmund

(57) ABSTRACT

The "Multiple Problem Ticket Creation Tool" (MPTCT) creates problem tickets on a network connected by an enterprise services bus having servers on the network with different problem ticketing systems. The MPTCT receives an original problem ticket, converts the original problem ticket to an XML or other format, determines which problem ticketing system is responsible for fixing the problem, determines which problem ticketing system are affected by the problem, creates an authoritative ticket on the responsible problem ticketing system, creates an informational ticket on every ticketing system affected by the problem, maps a tracking number between the original problem ticket and the related problem tickets created on other problem ticketing systems, tracks callbacks from each problem ticketing system, updates each related problem ticket with the callback information, and closes each related informational problem ticket and the original problem ticket when the authoritative problem ticket is closed.

20 Claims, 5 Drawing Sheets

SYSTEM AND METHOD OF MANAGING EVENTS ON MULTIPLE PROBLEM TICKETING SYSTEM

FIELD OF THE INVENTION

The present invention relates generally to data processing system error or fault handling, and specifically to error notification.

BACKGROUND OF THE INVENTION

IBM's On Demand Data Centre Services (ODCS) provides flexible computer server resources to customers based on the customer's need. ODCS involves three clssifications of servers: Managed end-point servers, infrastructure servers, and management servers. Managed end-point servers are servers wholly dedicated to a specific customer. Infrastucture servers provide additional "on-demand" capacity to customers, and may be used by more than one customer at a time. System Management servers control the entire ODCS system, managing both the end-point servers and the infrastructure servers.

When a problem or event occurs on any of the servers, a "problem ticket" is generated, either automatically by software that monitors a server for errors, or manually by a user who encounters a problem. U.S. Pat. No. 6,026,500 describes an example of software that automatically detects events and automatically creates a single problem ticket.

In the ODCS environment, multiple problem tickets generally must be opened when a problem occurs that affects multiple systems within the ODCS environment. Moreover, the customer's internal problem ticketing system may also require an open ticket. Additionally, the system used by the party responsible for fixing the problem needs to open an "authoritative" ticket. Other systems affected by the problem need to open an "informational" ticket. All status updates, or "callbacks," need to be published to each related open ticket. Once the problem is solved and the authoritative ticket is closed, all related informational tickets need to be closed.

A need exists for a system that coordinates the handling of problem tickets across multiple computer systems. The system would first automatically obtain information from an initial problem ticket. The initial problem ticket can either be manually created or automatically created in response to an event. The system would then determine which problem ticketing system (or systems) the initial ticket applies to, open an additional problem ticket for each applicable problem ticketing system, and track and update each related problem ticket until the authoritative ticket is closed, and then close all other related tickets.

These and other objects of the invention will be apparent to those skilled in the art from the following detailed description of a preferred embodiment of the invention.

SUMMARY OF THE INVENTION

The invention meeting the need identified above is a Multiple Problem Ticket Creation Tool (MPTCT) that creates problem tickets on a network connected by an enterprise services bus having servers on the network with different problem ticketing systems. The MPTCT receives an original problem ticket, converts the original problem ticket to an XML or other format, determines which problem ticketing system is responsible for fixing the problem, determines which problem ticketing system are affected by the problem, creates an authoritative ticket on the responsible problem ticketing system, creates an informational ticket on every ticketing system affected by the problem, maps a tracking number between the original problem ticket and the related problem tickets created on other problem ticketing systems, tracks callbacks from each problem ticketing system, updates each related problem ticket with the callback information, and closes each related informational problem ticket and the original problem ticket when the authoritative problem ticket is closed.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Multiple Problem Ticket Creation Tool" or "MPTCT".

Figure 1:
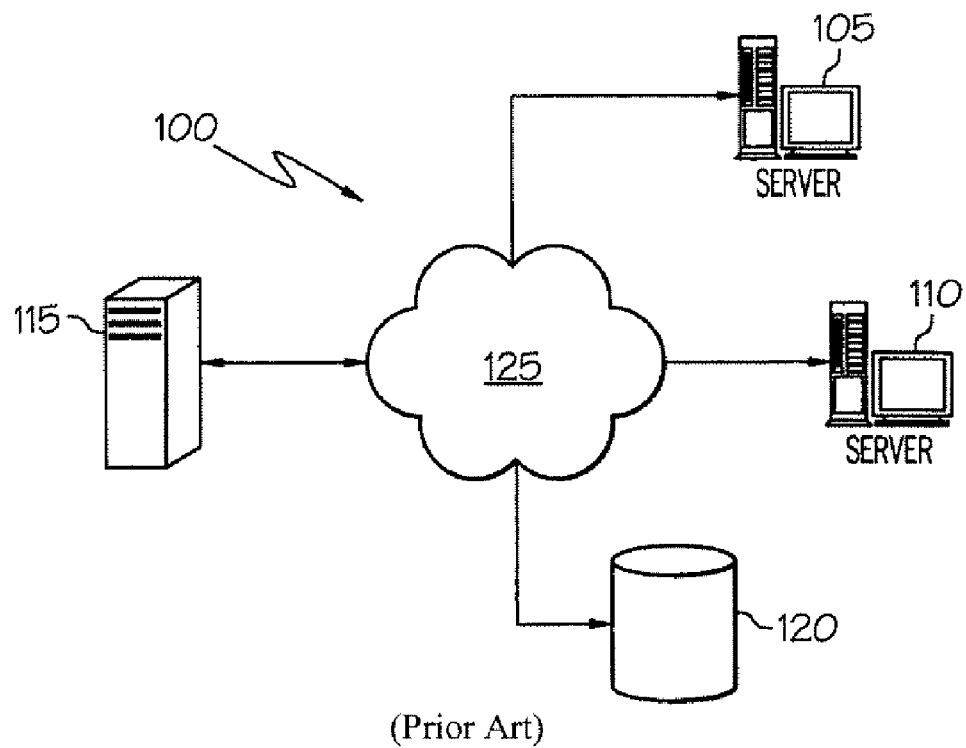
FIG. 1 represents an exemplary computer network.

Additionally, the MPTCT is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

In one embodiment, network nodes 105-120 may be computer systems, each having a different problem ticketing system. Network 100 uses an Enterprise Service Bus ("ESB") with Publish/Subscribe to route events between the multiple computer systems. The problem ticketing system on each computer system subscribes to the ESB. Any problem ticket generated by any of the problem ticketing systems is published to the ESB. One computer system on network 100 is responsible for system management of the entire network.

Figure 2:
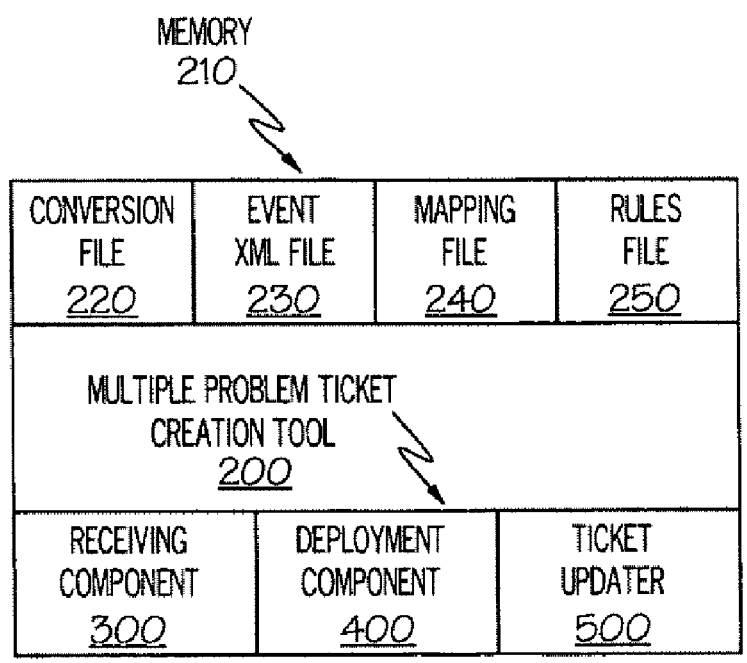
FIG. 2 describes programs and files in memory on a computer.

MPTCT 200 typically is stored in a memory, represented schematically as memory 210 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 210. As depicted in FIG. 2, though, memory 210 may include additional data and programs. Of particular import to MPTCT 200, memory 210 may include the following MPTCT 200 components: Receiving Component 300, Deployment Component 400 and Ticket Updater 500. Memory 210 may also include the following files with which MPTCT 200 interacts: conversion file 220, event XML file 230, mapping file 240 and rules file 250.

Conversion file 220 contains all the information necessary to convert an original problem ticket into an XML file, and information necessary to convert the XML file into compatible formats for the problem ticketing systems of network nodes 105-120. The XML format is only one example of possible formats, and is used throughout this description. One skilled in the art would understand that other formats may also be used. A separate Conversion file 220 may exist for each problem ticketing system, or a global Conversion file 220 may contain information for all ticketing systems present on network nodes 105-120. Event XML file 230 contains all the information from the original problem ticket, as well as any updates related to the resolution of the problem. Event XML file 230 is created by Receiving Component 300. XML files store information in a manner that allows for easy conversion to other formats. Mapping file 240 contains data used to track the relationship between the original problem ticket and any authoritative and informational tickets generated by the MPTCT. Mapping file 240 is created by Deployment Component 400. Rules file 250 contains a matrix used by the MPTCT to determine the responsible computer system for addressing a predefined problem or event, and any computer systems affected by the problem or event. Rules file 250 also lists a default problem ticketing system responsible for problems or events not defined in the matrix. Rules file 250 is created by the administrators of network 100.

Figure 3:
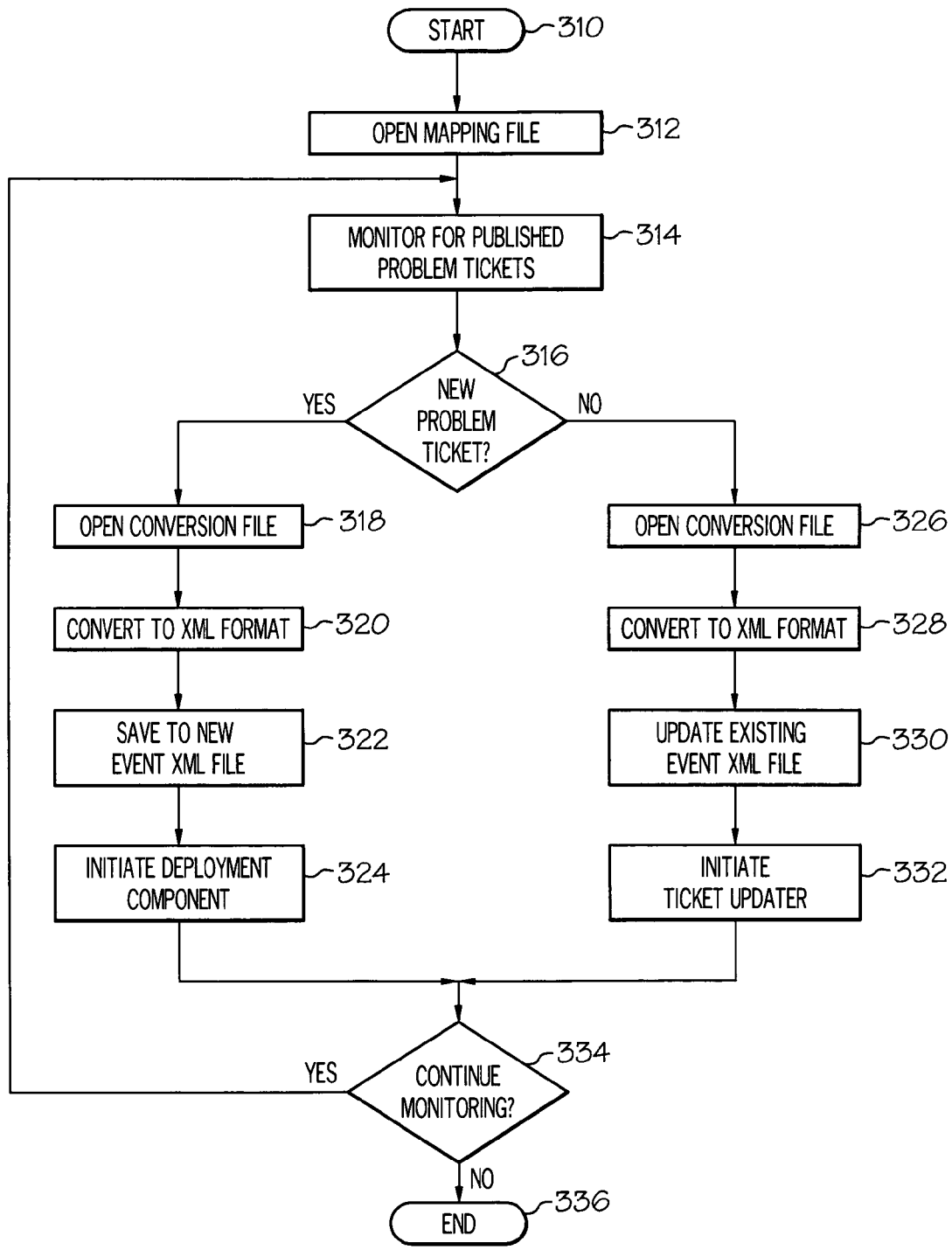
FIG. 3 is a flow chart of the Receiving Component.

As shown in FIG. 3, Receiving Component 300 starts (310) when initiated by the system management of the network 100. Receiving Component 300 can start manually or automatically. Receiving Component 300 opens mapping file 240 (312) and monitors for problem tickets to be published by a problem ticketing system on network 100 (314). When a problem ticket is published, Receiving Component 300 references mapping file 240 and determines whether the problem ticket is a new original problem ticket or an update to an open problem ticket (316). If the problem ticket is new, Receiving Component 300 opens conversion file 220 (318) and converts the published problem ticket into an XML format (320) which is saved to a new copy of event XML file 230 (322). Receiving Component 300 then initiates Deployment Component 400 (324). If the published problem ticket is an update to an open problem ticket, Receiving Component 300 opens conversion file 220 (326) and converts the published problem ticket into an XML format (328) which is saved to an existing copy of event XML file 230 (330). Receiving Component 300 then initiates Ticket Updater 500 (332). Receiving Component 300 continues to monitor (334) for published problem tickets until the system management of network 100 shuts down Receiving Component 300 (336).

Figure 4:
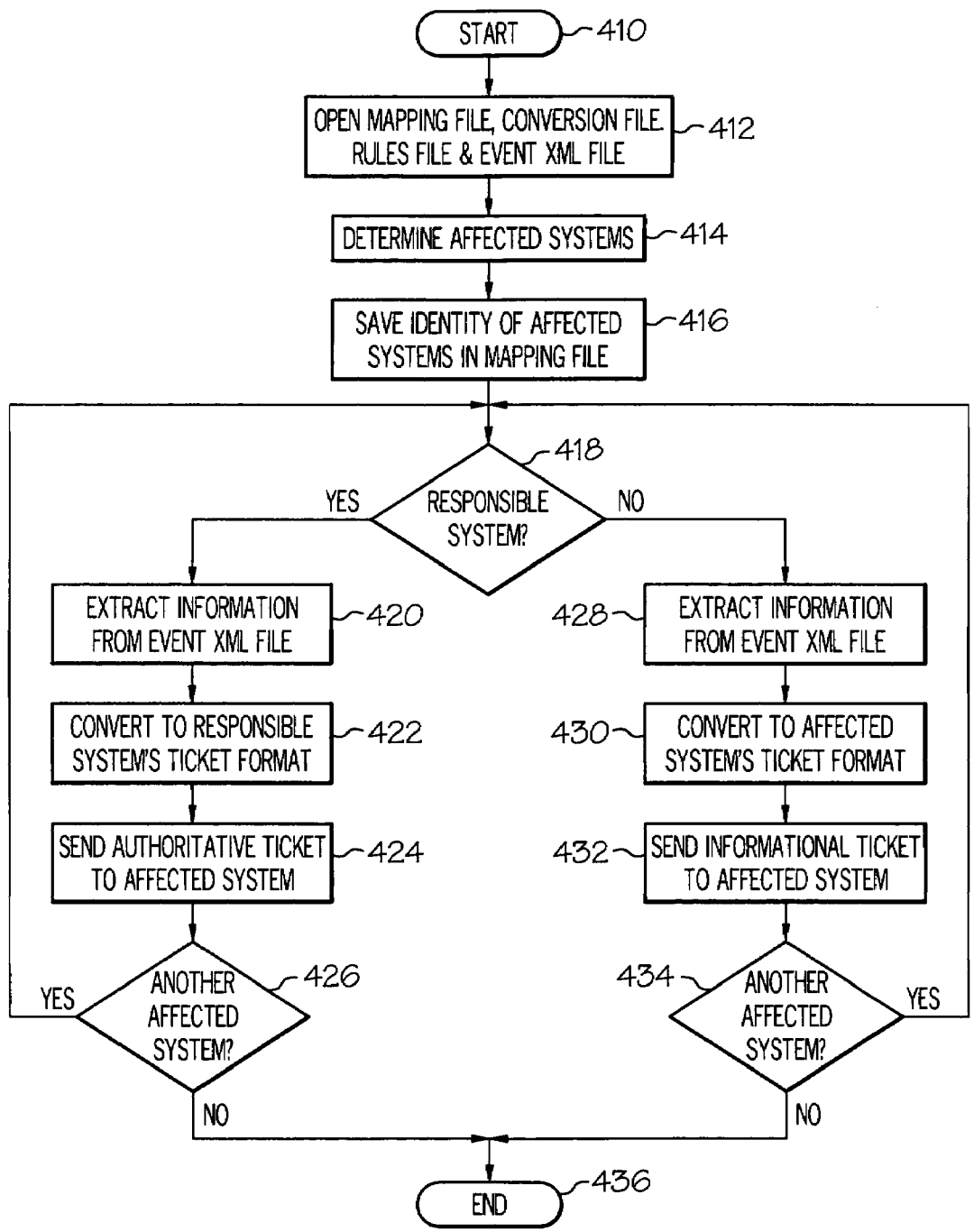
FIG. 4 is a flow chart of the Deployment Component.

As shown in FIG. 4, Deployment Component 400 starts when initiated by Receiving Component 300 (410). Deployment Component 400 opens mapping file 240, conversion file 220, rules file 250 and event XML file 230 (412). Deployment Component 400 uses the event XML file 230 and rules file 250 to identify which computer system on network 100 is responsible for correcting the problem (the "owning" system") and which computer systems are otherwise affected by the problem (414). If no computer system on network 100 is clearly responsible for correcting the problem, rules file 250 contains a default owning computer system. Deployment Component 400 saves the identity of the owning and other affected computer systems in mapping file 240 (416). Affected computers systems include the computer system that published the original problem ticket. Deployment Component 400 steps through the list of affected computer systems in mapping file 240 (418). If the affected computer system is responsible for fixing the problem, Deployment Component 400 extracts information from event XML file 230 (420), converts the information to the proper format for the affected computer system (422), and sends the information necessary to create an authoritative ticket on the owning computer system's problem ticketing system (424). Deployment Component 400 steps through to the next affected computer system in mapping file 240 (426). If the affected computer system is not responsible for fixing the problem, Deployment Component 400 extracts information from event XML file 230 (428), converts the information to the proper format for the affected computer system (430), and sends the information necessary to create an informational ticket on the affected computer system's problem ticketing system (432). Deployment Component 400 steps through to the next affected computer system in mapping file 240 (434). The authoritative and informational tickets contain a tracking number corresponding to the original problem ticket information in mapping file 240, so that subsequent updates to the problem ticket status may be updated on all affected computer system's ticketing system. All the tickets generated because of the same original ticket, are called "related tickets". After exhausting the list of affected systems, Deployment Component 400 stops (436).

Figure 5:
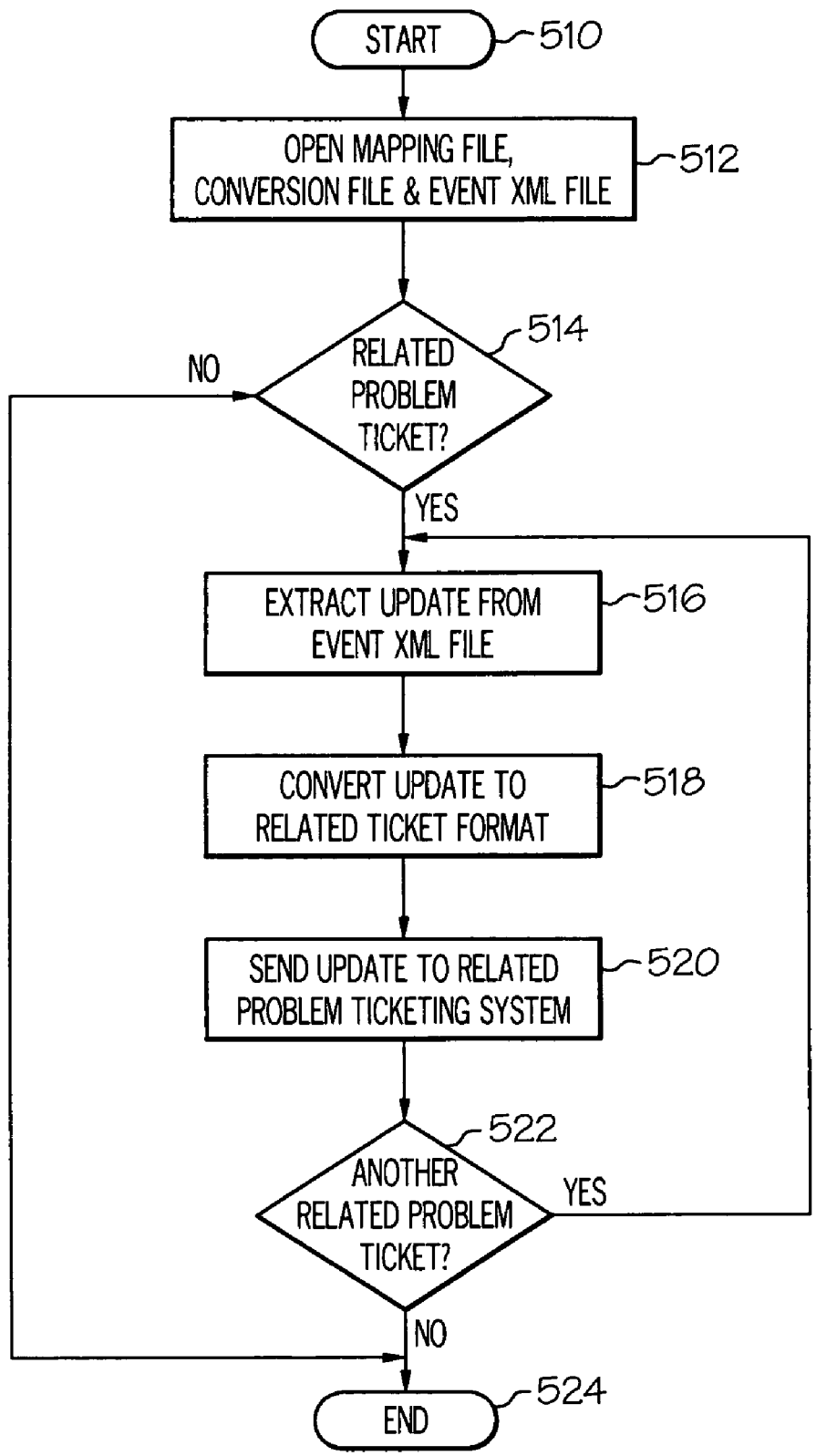
FIG. 5 is a flow chart of the Ticket Updater.

As shown in FIG. 5, Ticket Updater 500 starts when initiated by the Receiving Component 300 (510). Ticket Updater 500 opens mapping file 240, conversion file 220 and event XML file 230 (512). Ticket Updater 500 references mapping file 240 to determine if there are any related tickets on other computer systems (514). If a related ticket exists, Ticket Updater 500 extracts the updated information from event XML file 230 (516), converts the updated information to the proper format for the related ticket's computer system (518), and sends the update to the related ticket's problem ticketing system (520). Ticket Updater 500 steps to the next related ticket in the mapping file 240 (522). The steps of updating the related tickets are repeated for every related ticket (516-522).

If there is no related ticket, or after all related tickets are updated, Ticket Updater 500 stops (524). The updates may come from the original ticket, the authoritative ticket or any related informational tickets. The updated problem ticket information may include a status change, such as closing the ticket. If the authoritative ticket is closed, Ticket Updater 500 closes all related tickets.

An additional embodiment of the MPTCT allows users to automatically transfer ownership of the authoritative problem ticket to another problem ticketing system. This would happen after the MPTCT makes the initial assignment of the authoritative problem ticket. The need for a transfer occurs when a technician or administrator receives an authoritative problem ticket and determines the problem should be resolved on another problem ticketing system. The technician or administrator of the owning problem ticketing system initiates the transfer of ownership process by designating to the MPTCT which problem ticketing system should have responsibility for resolving the problem. The MPTCT receives the designation and sends the information necessary to create an authoritative ticket on the newly designated problem ticketing system. The MPTCT updates all other related problem tickets indicating the transfer of ownership.

Figure 6:
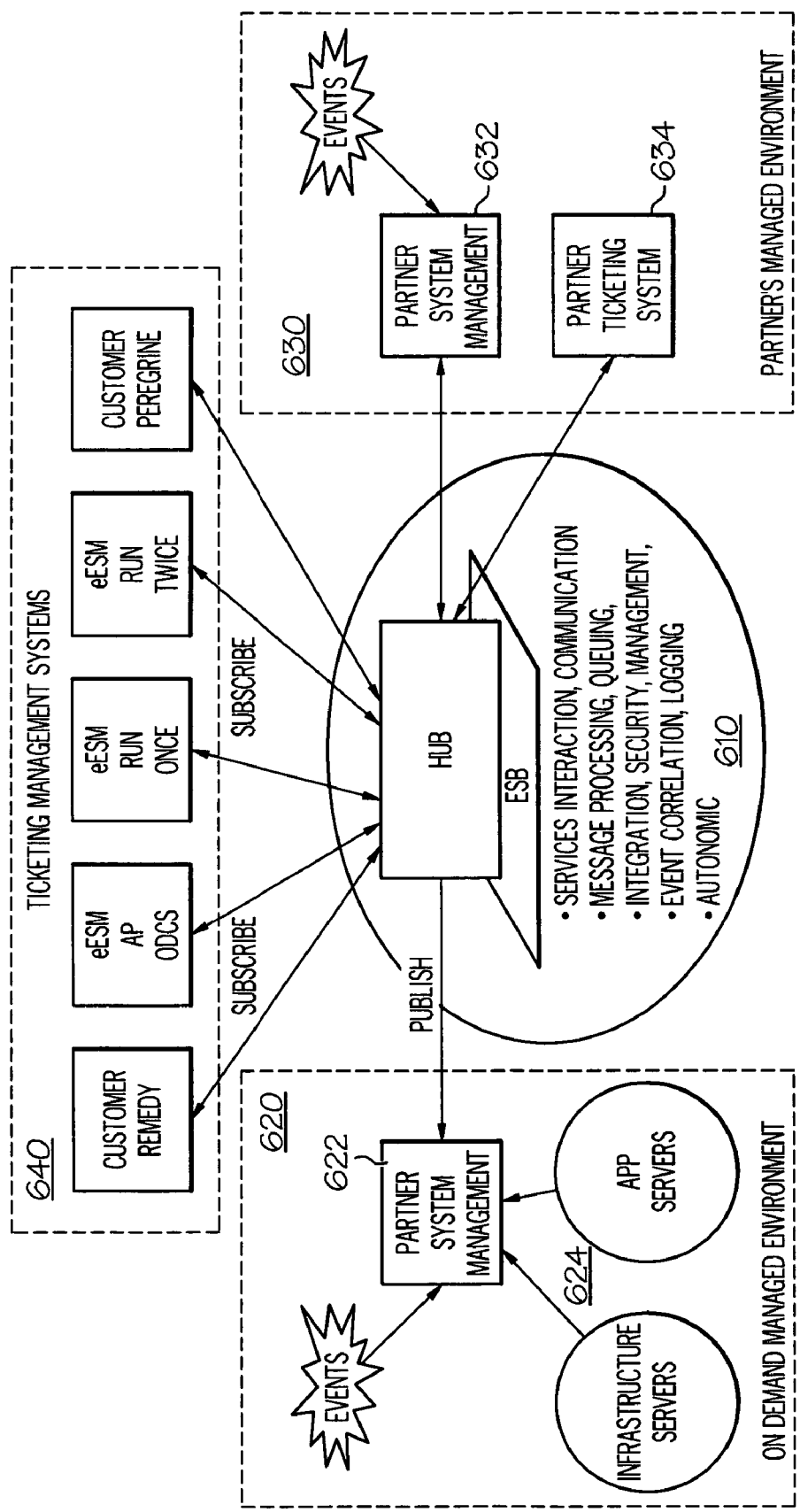
FIG. 6 is a diagram of one embodiment of the invention.

An exemplary embodiment of the invention using network environment 600 is shown in FIG. 6. Enterprise Serial Bus ("ESB") 610 connects to On Demand Managed Environment 620 and Partners' Managed Environment 630. Additionally, multiple Ticketing Management Systems 640 connect to ESB 610. All communications between nodes 620-640 are handled by ESB 610. Each of Ticketing Management Systems 640 and the Partner Ticketing System 634 subscribe to ESB 610. Original problem tickets are published to ESB 610 by a subscribing ticketing management system. MPTCT determines which systems are affected by the original problem ticket, and publishes authoritative and informational problem tickets to the subscribing ticketing management systems as needed. MPTCT continues to monitor and update open tickets until the authoritative ticket is closed.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for creating problem tickets on a network connected by an enterprise services bus, wherein servers on the network have different problem ticketing systems, the process comprising:
   receiving an original problem ticket;
   converting the original problem ticket to a standardized format;
   determining which problem ticketing system is responsible for fixing the problem;
   determining which problem ticketing systems are affected by the problem;
   creating an authoritative ticket on the responsible problem ticketing system;
   creating an informational ticket on every ticketing system affected by the problem;
   mapping a tracking number between the original problem ticket and the related problem tickets created on other problem ticketing systems;
   tracking callbacks from each problem ticketing system;
   updating each related problem ticket with the callback information; and
   closing each related informational problem ticket and the original problem ticket when the authoritative problem ticket is closed.

2. The method of claim 1 wherein the standardized format is extensible markup language (XML).

3. The method of claim 1 wherein a look-up table is used to determine which problem ticketing systems are responsible for fixing the problem and which problem ticketing systems are affected by the problem.

4. The method of claim 1 wherein the original problem ticket is automatically created in response to an event.

5. The method claim 1 wherein the network connected by an Enterprise Service Bus comprises an On Demand Managed Environment.

6. The method of claim 5 wherein the network connected by an Enterprise Service Bus further comprises a Partner's Managed Environment.

7. The method of claim 6 wherein the network connected by an Enterprise Service Bus further comprises a computer system responsible for system management of the network.

8. An apparatus for creating problem tickets on multiple problem ticketing systems, the apparatus comprising: a processor;
   a memory connected to the processor;
   an original problem ticket stored in the memory; and
   a multiple problem ticket creation tool computer program in the memory operable to convert the original problem ticket to a standardized format, determine which problem ticketing system is responsible for fixing the problem, determine which problem ticketing systems are affected by the problem, create an authoritative ticket on the responsible problem ticketing system; create an informational ticket on every ticketing system affected by the problem, map a tracking number between the original problem ticket and the related problem tickets created on other problem ticketing systems, track callbacks from each problem ticketing system, update each related problem ticket with the callback information, and close each related informational problem ticket and the original problem ticket when the authoritative problem ticket is closed.

9. The apparatus of claim 8 wherein the standardized format used by the multiple problem ticket creation tool computer program is extensible markup language (XML).

10. The apparatus of claim 8 wherein a look-up table is used to determine which problem ticketing systems are responsible for fixing the problem and which problem ticketing systems are affected by the problem.

11. The apparatus of claim 8 wherein the original problem ticket is automatically created in response to an event.

12. The apparatus of claim 8 further comprising a computer network connected by an Enterprise Service Bus.

13. The apparatus of claim 12 further comprising an On Demand Managed Environment.

14. The apparatus of claim 13 further comprising a Partner's Managed Environment.

15. The apparatus of claim 14 further comprising a processor responsible for system management of the network.

16. A computer readable memory containing instructions to cause a computer to create problem tickets on a network connected by an enterprise services bus, wherein servers on the network have different problem ticketing systems, the instructions comprising:
   receive an original problem ticket;
   convert the original problem ticket to a standardized format;

determine which problem ticketing system is responsible for fixing the problem;
determine which problem ticketing systems are affected by the problem;
create an authoritative ticket on the responsible problem ticketing system;
create an informational ticket on every ticketing system affected by the problem;
map a tracking number between the original problem ticket and the related problem tickets created on other problem ticketing systems;
track callbacks from each problem ticketing system;
update each related problem ticket with the callback information; and
close each related informational problem ticket and the original problem ticket when the authoritative problem ticket is closed.

17. The computer readable memory of claim 16 wherein the standardized format is extensible markup language (XML).

18. The computer readable memory of claim 16 wherein a look-up table is used to determine which problem ticketing systems are responsible for fixing the problem and which problem ticketing systems are affected by the problem.

19. The computer readable memory of claim 16 wherein the original problem ticket is automatically created in response to an event.

20. The computer readable memory of claim 16 wherein the network is connected by an Enterprise Service Bus and further comprises a computer system responsible for system management of the network.

* * * * *